United States Patent
Choi et al.

(10) Patent No.: US 10,366,807 B2
(45) Date of Patent: Jul. 30, 2019

(54) RESIN COMPOSITION FOR AUTOMOTIVE CABLE MATERIAL AND CABLE USING THE SAME

(71) Applicants: Hyundai Motor Company, Seoul (KR); KyungshinCable Co., Ltd., Cheonan, Chungcheongnam-Do (KR); Taesung Electro-Circuit Systems, Cheonan, Chungcheongnam-Do (KR)

(72) Inventors: Seung Woo Choi, Seoul (KR); Jae Ik Jung, Chungcheongnam-do (KR); Dae Young Hwang, Chungcheongnam-do (KR)

(73) Assignees: Hyundai Motor Company, Seoul (KR); Kyungshin Cable Co., Ltd., Cheonan, Chungcheongnam-Do (KR); Taesung Electro-Circuit Systems, Cheonan, Chungcheongnam-Do (KR)

( * ) Notice: Subject to any disclaimer, the term of this patent is extended or adjusted under 35 U.S.C. 154(b) by 697 days.

(21) Appl. No.: 14/982,683

(22) Filed: Dec. 29, 2015

(65) Prior Publication Data
US 2017/0011816 A1  Jan. 12, 2017

(30) Foreign Application Priority Data
Jul. 9, 2015 (KR) .................. 10-2015-0097710

(51) Int. Cl.
| | | |
|---|---|---|
| C08K 3/20 | (2006.01) | |
| C08L 23/12 | (2006.01) | |
| H01B 3/44 | (2006.01) | |
| C09D 123/12 | (2006.01) | |
| C08K 5/092 | (2006.01) | |
| C08L 23/16 | (2006.01) | |

(Continued)

(52) U.S. Cl.
CPC ............ *H01B 3/441* (2013.01); *C08K 3/20* (2013.01); *C08K 5/092* (2013.01); *C08L 23/12* (2013.01); *C08L 23/16* (2013.01); *C08L 51/06* (2013.01); *C08L 53/00* (2013.01); *C09D 123/12* (2013.01); *C08L 2203/202* (2013.01)

(58) Field of Classification Search
CPC .......... C08L 23/12; C08L 53/00; C08K 5/092
See application file for complete search history.

(56) References Cited

U.S. PATENT DOCUMENTS

2002/0013417 A1 *  1/2002  Jung .................. C08L 23/12
                                                    525/240

FOREIGN PATENT DOCUMENTS

| JP | 2009-127040 | 6/2009 |
| KR | 10-2006-0095158 A | 8/2006 |

(Continued)

*Primary Examiner* — Vickey Nerangis
(74) *Attorney, Agent, or Firm* — Mintz Levin Cohn Ferris Glovsky and Popeo, P.C.; Peter F. Corless

(57) ABSTRACT

Disclosed are a resin composition for a cable material and a cable used for a vehicle and a method of manufacturing the cable thereof. In particularly, by controlling the components such as a polypropylene content, a flame retardant content and the like in a base resin, and containing a high crystalline homo polypropylene (PP) resin and a high crystalline block polypropylene resin in the base resin in a specific ratio, the resin composition provides excellent physical properties such as abrasion resistance and flexibility resistance and has reduced weight effect when a cable is manufactured using the resin composition.

9 Claims, 5 Drawing Sheets

< Copper Alloy >

< Copper Clad Steel >

(51) Int. Cl.
*C08L 51/06* (2006.01)
*C08L 53/00* (2006.01)

(56) References Cited

FOREIGN PATENT DOCUMENTS

| | | |
|---|---|---|
| KR | 10-0687363 B1 | 2/2007 |
| KR | 10-073615 | 7/2007 |
| KR | 10-0838039 | 6/2008 |
| KR | 10-2010-0025211 | 3/2010 |
| KR | 10-2010-0027316 | 3/2010 |
| KR | 10-2013-0057961 | 6/2013 |
| KR | 10-2013-0129356 A | 11/2013 |
| KR | 10-2014-0084749 A | 7/2014 |
| WO | WO-2010024602 A2 * 3/2010 ............. C08L 23/10 |

* cited by examiner

RESIN COMPOSITION FOR AUTOMOTIVE CABLE MATERIAL AND CABLE USING THE SAME

CROSS-REFERENCE TO RELATED APPLICATION

This application claims under 35 U.S.C. § 119(a) the benefit of Korean Patent Application No. 10-2015-0097710 filed on Jul. 9, 2015, the entire contents of which are incorporated herein by reference.

BACKGROUND (a) Technical Field

The present invention relates to a resin composition for a cable material and a cable, for example, a cable material for vehicles, using the same. The resin composition may include controlled contents of components such as polypropylene, a flame retardant content and the like in a base resin, thereby providing excellent physical properties such as abrasion resistance and flexibility resistance and reducing weight thereof. Further, the resin composition may be used in a cable for a vehicle.

(b) Background Art

A fine light cable used for vehicles requires high mechanical properties, high thermal resistance, high flame retardancy, abrasion resistance and the like reflecting vehicle vibration, durable environment and the like. In addition, productivity has been enhanced employing a cable extrusion speed to be as high as possible in a cable manufacturing process. Accordingly, a covering material for the cable for the vehicles needs to be suitable for extrusion process as well as to have the above-mentioned physical properties.

Generally, with an increase in the function of vehicle interior safety and convenience specification, the number of wiring circuits tends to increase gradually, and accompanying problems of lack of space and a weight increase have occurred. Accordingly, a tendency to use the fine light cable for vehicles has increased in order to secure space inside the vehicle, reducing vehicle weight, and respond to fuel efficiency regulations.

For the fine light cable, an insulation covering composition having high abrasion resistance and high hardness, and a high strength conductor material need to be used, such that copper alloy or CCS (copper clad steel) having strength of 700 MPa or greater has been used as a conductor for improving insertability and mechanical strength of the fine light cable connector.

In addition, switching to environmentally-friendly insulation materials (TPE, PP and the like) that do not generate harmful substances when burned, unlike existing cables made of a PVC material, has been in progress, and materials such as halogen and heavy metals that may influence environment may be excluded as a global trend.

However, a specific bromine-based flame retardant (DBDE), which exhibits relatively excellent flame retardancy in a PVC or polyolefin resin, has been suspected as a dioxin generating material, and several European countries have banned the use thereof. A metal hydroxide such as aluminum hydroxide ($Al(OH)_3$) and magnesium hydroxide ($Mg(OH)_2$), a phosphorous-based flame retardant, and the like, may be used, and DBDE has been known to be replaceable by a halogen-free material.

As described above, although a manufacturing cost increases for improving stability in case of fire and providing environmentally-friendly designs, the researches on environmentally-friendly cables have been actively carried out, because regulations such as a flame retarding property of a cable, and toxicity, corrosive gases and the amount of smoke generation during burning have been strengthened.

In a certain example, a conventional fine light cable such as 0.08 SQ, may not be inserted because the cable is too thin and bends, when the cable is inserted to a connector terminal unit. Accordingly, an insulation covering material composition having high abrasion resistance and flexural rigidity needs to be developed for smooth assembly workability such as cable insertion to a connector terminal unit, and the like.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention has been made in an effort to solve a problem of a cable when material for a cable is used as describe above, for example, the problem of not being inserted when the cable is too thin and bends when the cable is inserted to a connect terminal unit. Further, the present invention may develop an insulation covering material composition that may have substantially improved abrasion resistance and flexural rigidity for smooth assembly workability, for example, when the cable is inserted into the connector terminal unit. Accordingly, the present invention provides a resin composition for a cable material having improved physical properties such as abrasion resistance and flexibility resistance. Further, the resin composition may reduce the weight of the cable when the composition is used to manufacture a cable.

The "cable", as used herein, refers to a connecting component or part that comprises wires (e.g. metal, metal alloy, conductor or conductive component) for the use of electrical connection, and the wires are mostly covered or wrapped with non-conductive or insulating materials. In certain embodiments, by means of manufacturing of the present invention, the cable also may be formed in a fine light cable that has substantially reduced in weight and thickness. For example, the fine light cable may suitably have a insulation thickness range of about 0.15 to 0.5 mm, or a cable weight of about 0.25 to 3.0 kg/km.

In addition, the present invention provides a resin composition for a cable material, for example, a cable used in a vehicle, having excellent workability. As such, defects when inserting a cable to a connector terminal unit may not be generated, and a thermal resistance grade as an environmentally-friendly material when the composition is used as a material for the cable may be improved.

Furthermore, the present invention provides a high-quality cable using the resin composition for a cable material used in a vehicle as above.

In one aspect, the present invention provides a resin composition. The resin composition may comprise: a mixture of a base resin and a magnesium hydroxide flame retardant; an antioxidant; and a lubricant. In particular, the composition may comprise an amount of about 2 to 5 parts by weight of the antioxidant and an amount of about 0.5 to 2 parts by weight of the lubricant with respect to 100 parts by weight of the mixture. The mixture may include an amount of about 40 to 60% by weight of the base resin and an amount of about 60 to 40% by weight of the magnesium hydroxide flame retardant, based on the total weight of the mixture in the resin composition. In particular, a surface of the magnesium hydroxide flame retardant may be treated with silane or aliphatic or polymeric fatty acid.

The base resin may include 100 parts by weight of a high crystalline polypropylene resin, an amount of about 5 to 10 parts by weight of a modified polypropylene, and an amount of about 15 to 20 parts by weight of an elastomer.

The "high crystalline polypropylene" refers to a polymerized polypropylene material having degree of crystallinity of polymers (e.g. portion of ordered or lamellae structure of arrangement based on the total weight of the polypropylene polymer) greater than about 80, 70, 60, or 50%. Preferred high crystalline polypropylene may provide improved physical properties such as high stiffness, high heat resistance, good processability, and the like, thermal and chemical properties of the polypropylene polymers.

The "modified" polypropylene refers to a polypropylene that includes at least one or more of chemical groups such as maleic acid, silane, etc.

The high crystalline polypropylene resin may include an amount of about 60 to 90% by weight of a high crystalline homo polypropylene resin and an amount of about 10 to 40% by weight of a high crystalline block polypropylene resin, based on the total weight of the high crystalline polypropylene resin.

The "homo" polypropylene refers to a polypropylene comprising only propylene monomers. In addition, the "block" polypropylene refers to a copolymer of propylene monomers and other monomers, particularly in a manner where polypropylene monomers are grouped or polymerized together, while the other monomers are grouped or polymerized. As such, the block polypropylene may comprise homo polypropylene attached or joined with other homo polymers at either end, without limiting repetition number thereof. In preferred aspects, the block polypropylene comprises ethylene or butylene as comonomer and propylene. For example, the block polypropylene may include ethylene or butylene as comonomer and the content of the comonomer may be in an amount of about 0.1 to 10 wt.

The present invention further provides a resin composition that may consist of, consist essentially of, or essentially consist of the components as described above. For instance, the resin composition may consist of, consist essentially of, or essentially consist of: an amount of 100 parts by weight of the mixture that comprises a base resin and a magnesium hydroxide flame retardant; an amount of about 2 to 5 parts by weight of the antioxidant and an amount of about 0.5 to 2 parts by weight. The mixture may include an amount of about 40 to 60% by weight of the base resin and an amount of about 60 to 40% by weight of the magnesium hydroxide flame retardant, based on the total weight of the mixture in the resin composition.

In another aspect, the present invention provides a method for preparing a resin composition. The method may include extruding a resin composition including a mixture of a base resin and a magnesium hydroxide flame retardant; an antioxidant; and a lubricant.

The resin composition may include an amount of about 2 to 5 parts by weight of the antioxidant and an amount of about 0.5 to 2 parts by weight of the lubricant with respect to 100 parts by weight of the mixture. The mixture may include an amount of about 40 to 60% by weight of the base resin and an amount of about 60 to 40% by weight of the magnesium hydroxide flame retardant, and the magnesium hydroxide flame retardant may have a surface treated with silane or aliphatic or polymeric fatty acid. The base resin may include 100 parts by weight of a high crystalline polypropylene resin, an amount of about 5 to 10 parts by weight of a modified PP, and an amount of about 15 to 20 parts by weight of an elastomer. The high crystalline polypropylene resin may include an amount of about 60 to 90% by weight of a high crystalline homo polypropylene (PP) resin and an amount of about 10 to 40% by weight of a high crystalline block polypropylene resin, based on the total weight of the high crystalline polypropylene resin.

The extrusion may be carried out at a temperature of about 180 to 230° C.

The resin composition may further comprise maleic acid in an amount of about 0.1 to 3 parts by weight with respect to 100 parts by weight of the base resin; and an initiator or common additives.

In still another aspect, the present invention provides a cable. The cable may comprise a cable cover comprising the resin composition as described herein, and a conductor comprising copper alloy or CCS (copper clad steel).

As used herein, the "conductor" refers to an electrically conductive material formed in the cable to provide electric connectivity between at least two components. Such conductors may include metals, metal alloys, conductive ceramics, and the like, however, those conductors are not particularly limited to those materials.

The "cover" refers to a substance that covers a surface of other object. For example, the cable cover covers, wraps or surrounds the surface of the conductors included as cable components, as being directly or indirectly contacted with the conductors therein. The cable cover may not be particularly limited, however, the cable cover may comprise insulating materials to prevent currents from the conductor cores of the cable to outer surface of the cable.

The cable cover may be formed by extruding the resin composition comprising the components as described above.

The copper alloy or CCS (copper clad steel) may have a strength of about 700 MPa or greater.

The copper alloy may be an alloy conductor containing an amount of about 0.10 to 0.45% of Sn and may have a strength of 700 to 900 MPa and a conductivity of about 70 to 90% according to International Annealed Copper Standard (IACS).

The CCS may be a copper covered conductor having a copper-covering area of about 30 to 40%, a conductivity of about 35 to 45% according to IACS. Further, the CCS may have a strength property of 700 to 900 MPa when softened by 1 to 10%, as for elongation.

Further provided are vehicles that comprise the cable as described above. In particular, the cable may comprise the resin composition as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
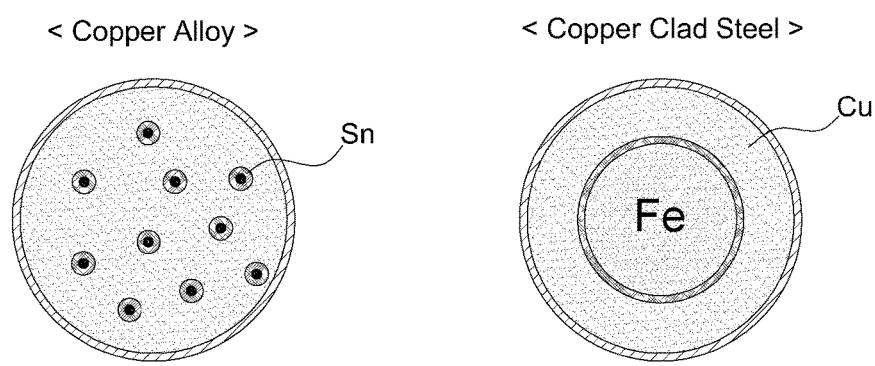
FIG. 1 shows an exemplary structure of copper alloy or CCS used according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides to a resin composition that can be used as a cable material of a vehicle and the resin composition may be manufactured as a cable component, or a fine light cable component. Further, the present invention provides a polymer composite material for a cable insulation which satisfies thermal class CLASS 1 (continuous service grade at a temperature of about 80° C.) according to the ISO 6722 standard.

The cable material can be thinned and reduced in weight to solve a problem of lack of space and weight increase that may occur from increased wiring circuits in accordance with increase in the function of vehicle interior safety and convenience specification. For example, a cable comprising a very thin insulation covering material may reduce a weight by maximum 68% with respect to AVSS 0.3SQ. Particularly, the present invention relates to an insulation covering material having improved abrasion resistance and flexural rigidity for smooth assembly workability, for example, when the cable is inserted to a connector terminal unit, and the like.

Accordingly, the resin composition of an insulation material is provided. The resin may comprise: a mixture of a base resin and a magnesium hydroxide flame retardant; an antioxidant; and a lubricant.

The composition may include an amount of about 2 to 5 parts by weight of the antioxidant and an amount of about 0.5 to 2 parts by weight of the lubricant with respect to 100 parts by weight of the mixture. The mixture may include an amount of about 40 to 60% by weight of the base resin and an amount of about 60 to 40% by weight of the magnesium hydroxide flame retardant, based on the total weigh of the mixture, and the magnesium hydroxide flame retardant may have a surface treated with silane or aliphatic or polymeric fatty acid.

The base resin may have 100 parts by weight of a high crystalline polypropylene resin, an amount of about 5 to 10 parts by weight of a modified PP, and an amount of about 15 to 20 parts by weight of an elastomer. Further, the high crystalline polypropylene resin may include an amount of about 60% or greater, or particularly an amount of about 60 to 90% by weight of a high crystalline homo polypropylene (PP) resin; and an amount of about 10% or greater, or particular an amount of about 10 to 40% by weight of a high crystalline block polypropylene resin, based on the total weight of the high crystalline polypropylene resin.

The components excluding high crystalline polypropylene in the base resin may be a resin composition including an olefin-based or styrene-based elastomer and modified PP. For example, the modified polypropylene may be included in an amount of about 5 to 10 parts by weight and the elastomer in an amount of about 15 to 20 parts by weight with respect to 100 parts by weight of the high crystalline PP.

The high crystalline polypropylene resin may have a resin having hardness (R Scale) of about 100 or greater, or particularly of about 100 to 300. In addition, the high crystalline polypropylene resin may have a melting index (MI) of 5 to 50 g/10 min, and a degree of crystallization of 50% or greater or particularly of about 50 to 80%. When the hardness is less than the predetermined range, for example, less than about 100, abrasion resistance and insertability may be significantly low. When the melting index is less than the predetermined range, for example, less than about 5 g/10 min, extrusion machineability may be significantly reduced thereby reducing extrusion workability and productivity. When the melting index is greater than the predetermined range, for example, greater than about 50 g/10 min, the covering thickness may be non-uniformly formed thereby causing a functional problem in a cable. In addition, when the degree of crystallization is less than the predetermined range, for example, less than about 50%, surface hardness of a cable may be reduced thereby reducing abrasion resistance and insertability.

The other additives may be included in the resin composition, such as an amount of about 0.1 to 3 parts by weight of maleic acid with respect to 100 parts by weight of the base resin, and initiator may be additionally included in the above-mentioned composition.

The mechanical properties and cold resistance may decline as the polypropylene content increases in the base resin. Accordingly, the resin composition using an elastomer may be suitable for improving this phenomenon. The modified polypropylene may be important to mix the flame retardant and the base resin suitably. Accordingly, the resin composition may be prepared by mixing maleic acid, an antioxidant, an initiator and the like, for example, with the resin in a twin extruder, and then reacting and extruding the result.

When the base resin may be included in less than about 40% by weight in the mixture of the base resin and a flame retardant, the flame retardant may be excessively included in the resin. As a result, although flame retardancy may sufficiently increase, elongation percentage may not be sufficiently obtained, such as below the standard, and cracks may occur even after heating. In addition, when the base resin is included in greater than about 60% by weight, the flame retardant content may not be sufficient such that sufficient flame retardancy (self-extinguishability) may not be obtained.

The resin composition may be prepared by extruding raw materials of the above-mentioned composition at an extrusion temperature of about 180 to 230° C. For example, the extrusion may be performed at a temperature of about 200° C. in a twin extruder (e.g. L/D 27, 40 mm).

The cable having preferable physical properties may be manufactured using the resin composition as described above.

The copper alloy or CCS (copper clad steel) having strength of about 700 MPa or greater may be used as a conductor used in a cable in order to enhance insertability to a connector and mechanical strength of a cable. The alloy conductor, e.g. copper alloy, may contain an amount of about 0.10 to 0.45% of Sn and may have a strength of 700 to 900 MPa and conductivity of 70 to 90% according to IACS. In addition, a copper covered conductor having a copper area of about 30 to 40%, conductivity of about 35 to 45% according to IACS. For elongation, the copper covered conductor may have a strength property of about 700 to 900 MPa when softened by about 1 to 10% may be used as the CCS.

Figure 2A:
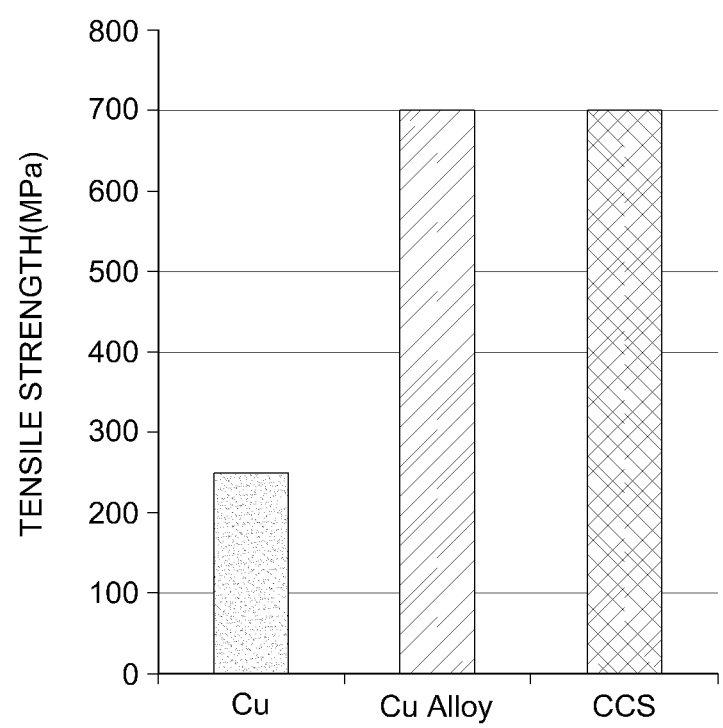
FIG. 2A is a graph comparing tensile strength of copper, copper alloy or CCS according to an exemplary embodiment of the present invention.
Figure 2B:
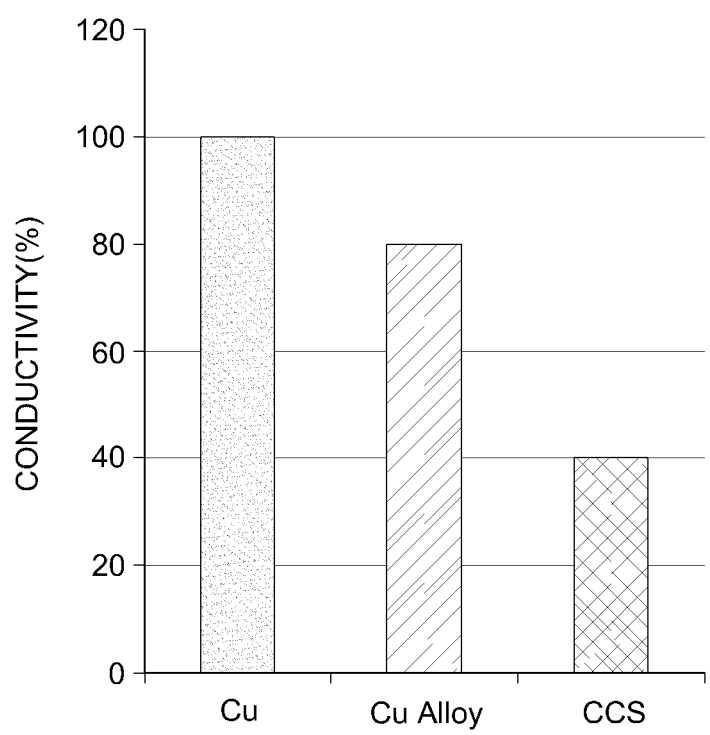
FIG. 2B is a graph comparing conductivity of copper, copper alloy or CCS according to an exemplary embodiment of the present invention.

A multifaceted structure of the copper alloy or CCS according to an exemplary embodiment of the present invention is shown in FIG. 1, and tensile strength and conductivity comparisons on these are as shown in FIGS. 2A and 2B, respectively.

When the cable is manufactured using the resin composition, the cable may be manufactured by extruding the composition at, for example, an extrusion temperature of 210 to 250° C. or particularly at the temperature of about 220° C. using an L/D 27, 45 extruder.

When the resin composition is formed according to various exemplary embodiments of the present invention and a cable is manufactured using the same, substantially improved tensile strength and abrasion resistance of the products may be obtained although covering thickness of the cable is reduced, and thermal resistance may be improved. Accordingly, the cable manufactured as described above may be used as an environment-friendly flame retardant material that does not include halogen elements. In addition, the cable may be manufactured into as the cable that may be suitably inserted to a connector terminal unit.

EXAMPLES

The following examples illustrate the invention and are not intended to limit the same.

Examples 1 to 3 and Comparative Examples 1 to 10

In order to form a resin composition for an automotive cable material, resin compositions were prepared by following Table 1, and their physical properties were also provided in the following Table 1.

As for each component used in the following Table 1, the components of Table 2 were used.

TABLE 1

| Items | Raw Materials | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|
| Base Resin | PP 1 | 60 | 65 | 60 | 60 | 60 | 60 | 60 | 50 | | | | 65 | 60 |
| | PP 2 | 10 | 10 | 15 | 10 | 20 | 10 | 10 | 20 | | | | 5 | |
| | PP 3 | | | | | | | | | | | | | 10 |
| | PP 4 | | | | | | | | | | 50 | 40 | | |
| | PP 5 | | | | | | | | | 70 | 20 | 30 | | |
| | PP 6 | 10 | 5 | 10 | 5 | 10 | 10 | 10 | 10 | 10 | 10 | 10 | 10 | 10 |
| | ELAS 1 | 20 | 20 | 15 | 25 | 10 | 20 | 20 | 20 | 20 | 20 | 20 | 10 | 20 |
| Flame Retardant | Flame Retardant | 100 | 100 | 100 | 100 | 100 | 160 | 20 | 100 | 100 | 100 | 100 | 100 | 100 |
| Antioxidant | Antioxidant 1 | 4 | 4 | 4 | 4 | 4 | 4 | 4 | 4 | 4 | 4 | 4 | 100 | 4 |
| | Antioxidant 2 | 3 | 3 | 3 | 3 | 3 | 3 | 3 | 3 | 3 | 3 | 3 | 4 | 3 |
| Lubricant | Lubricant | 2 | 2 | 2 | 2 | 2 | 2 | 2 | 2 | 2 | 2 | 2 | 3 | 2 |

TABLE 2

| Category | Manufacturer | Grade | MI | Flexural Rigidity (Kgf/cm²) | R hardness | Degree of Crystallization | Remarks |
|---|---|---|---|---|---|---|---|
| PP 1 | PolyMirae | HA748L | 6 | 22500 | 110 | 61 | High Crystalline Homo PP |
| PP 2 | PolyMirae | EA 5074 | 30 | 16000 | 110 | 57 | High Crystalline Block PP |
| PP 3 | PolyMirae | EC 340R | 25 | 9500 | 40 | 47 | High Crystalline Block PP |
| PP 4 | PolyMirae | HP 622J | 3 | 16000 | 95 | 55 | Homo PP |
| PP 5 | PolyMirae | BA 238A | 11 | 9000 | 60 | 42 | Block PP |
| PP 6 | Self-Manufactured | — | — | — | — | — | Modified PP |
| ELAS 1 | Dow Chemical | 8003 | 1 | — | — | — | ELASTOMER |
| Flame Retardant | Kyowa Chemical | KISUMA 5P | | | | | |
| Antioxidant 1 | BASF | AO 1010 | | | | | |
| Antioxidant 2 | BASF | MD 1024 | | | | | |
| Lubricant | Lion Chemical | LC WAX 102N | | | | | |

Test Example

Each physical property of the resin compositions having the compositions according to the Table 1 was evaluated, and the results are shown in the following Table 3 and Table 4.

Figure 3:
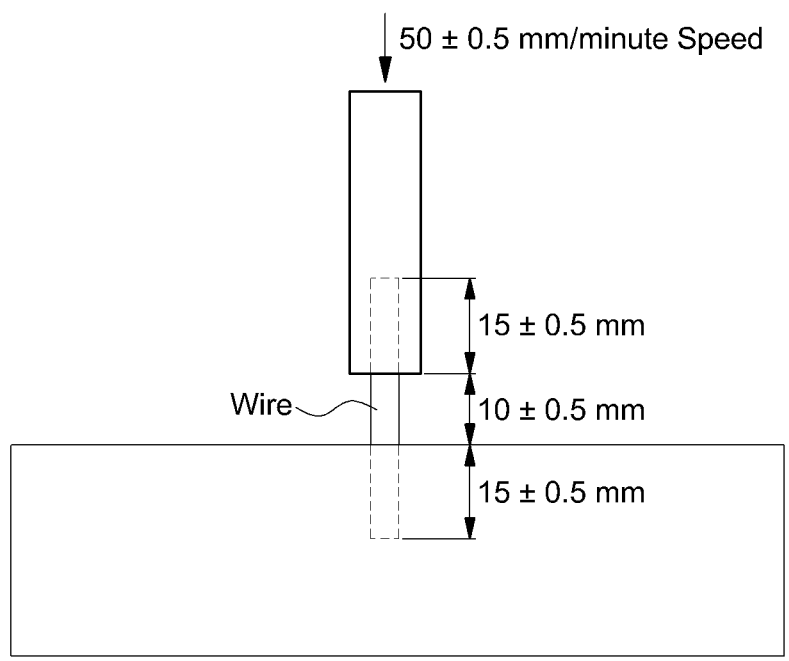
FIG. 3 shows an exemplary method of measuring minimum bending force of a cable for insertion to a connector terminal.

As a reference, minimum bending force of the cable for being inserted to a connector terminal was 2.0 kgf, and the measurements were carried out in the manner shown in FIG. 3.

TABLE 3

| | | | | | Test Value | | | | | | | |
|---|---|---|---|---|---|---|---|---|---|---|---|---|
| No. | Test Items | Test Method | Unit | Spec. | Example 1 | Example 2 | Example 3 | Comparative Example 1 | Comparative Example 2 | Comparative Example 3 | Comparative Example 4 | Remarks |
| 1 | Room Temperature Tensile Strength | ASTM D 638 | N/mm² | 1.6 | 3.1 | 2.9 | 3.2 | 2.2 | 3.2 | 2.0 | 2.5 | 23° C. (50 mm/min) |
| | | Elongation Percentage | % | 150 | 280 | 320 | 190 | 330 | 125 FAIL | 70 FAIL | 330 | |
| 2 | After Heating | Residual Tensile | ASTM D 638 | % | 85 | 98 | 97 | 98 | 97 | 95 | Cracks | 98 | 113° C., 168 Hours |
| | | Residual Elongation | | % | 65 | 84 | 84 | 86 | 86 | 84 | Cracks | 86 | |
| 3 | Flame Retardancy | | — | Self-Extinguished | PASS | PASS | PASS | PASS | PASS | PASS | NG | Self-Extinguishability |
| 4 | Abrasion Resistance 2 (SCRAPE RESISTANCE) | ISO 6722 | Times | 100 | Pass (200↑) | Pass (200↑) | Pass (200↑) | Pass (200↑) | Pass (200↑) | Pass (200↑) | Fail (100↓) | — |
| 5 | Bending Force | — | kgf | 2.0 | 2.0 | 2.1 | 2.1 | 1.1 | 2.1 | 1.5 | 0.4 | — |

TABLE 4

| No. | Test Items | | Test Method | Unit | Spec. | Comparative Example 5 | Comparative Example 6 | Comparative Example 7 | Comparative Example 8 | Comparative Example 9 | Comparative Example 10 | Remarks |
|---|---|---|---|---|---|---|---|---|---|---|---|---|
| 1 | Room Temperature | Tensile Strength | ASTM D 638 | N/mm$^2$ | 1.6 | 2.5 | 2.3 | 2.2 | 2.4 | 2.8 | 2.5 | 23° C. (50 mm/min) |
|   |   | Elongation Percentage |   | % | 150 | 290 | 270 | 290 | 350 | 250 | 270 |   |
| 2 | After Heating | Residual Tensile | ASTM D 638 | % | 85 | 96 | 95 | 96 | 94 | 96 | 94 | 113° C., 168 Hours |
|   |   | Residual Elongation |   | % | 65 | 80 | 83 | 81 | 82 | 84 | 82 |   |
| 3 | Flame Retardancy | | — |   | Self-Extinguished | PASS | PASS | PASS | PASS | PASS | PASS | Self-Extinguishability |
| 4 | Abrasion Resistance 2 (SCRAPE RESISTANCE) | | ISO 6722 | Times | 100 | Fail (100↓) | Fail (100↓) | Fail (100↓) | Fail (100↓) | Pass (200↑) | Fail (100↓) | — |
| 5 | bending force | | — | kgf | 2.0 | 1.6 | 0.2 | 0.5 | 0.4 | 1.7 | 1.5 | — |

As a result of the physical property evaluations on the cables using the resin composition, a weight when the cabled was bent as being inserted to a connector was measured as the bending force (column strength test). The increase in the bending force means an enhanced wiring hardness assembling property. For the conventional product, the bending force was 0.5 kgf, and for the products in Examples, the bending force was 2.0 kgf or greater, which means that the exemplary products in Examples had improvement effects of 400% or greater.

In addition, tensile strength was measured using a scrape abrasion test, and the conventional product, tensile strength was 2.2 kgf/mm$^2$ based on the scrape abrasion of 70 times, however, for products in Examples, tensile strength was 3.1 kgf/mm$^2$ based on the scrape abrasion of 448 times (increased by 640%), which was enhanced by 12%. Thus, it was confirmed that the products in Examples had significantly enhanced abrasion resistance.

Figure 4:
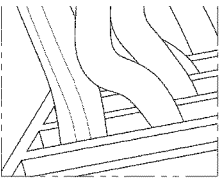
FIG. 4 shows comparison results through field application for an exemplary product in Examples according to an exemplary embodiment of the present invention in comparison with a conventional product.

In addition, as a result of the comparisons through field application for exemplary products in Examples of the present invention in comparison to the conventional product, it was confirmed that the product of the present invention obtained significantly improved physical properties as shown in FIG. 4.

When a cable or cable material for a vehicle is manufactured using a resin composition according to the present invention, an insulation property with improved tensile strength and abrasion resistance greater than conventional products may be obtained although, for example, the cable material may have a thickness decreased from about 0.3 mm to about 0.2 mm.

In addition, a resin composition according to the present invention may be used as a composite material capable of satisfying thermal class CLASS 1 (continuous service grade at a temperature 80° C.) according to the ISO 6722 standard, and the cable with excellent physical properties may be manufactured.

Furthermore, a resin composition according to the present invention may be an environmentally-friendly flame retardant material that does not include halogen elements, and therefore, an environmentally-friendly cable having excellent physical properties may be prepared effectively.

Particularly, when a cable is manufactured using a resin composition according to the present invention, the cable being inserted efficiently to a connector terminal unit can be manufactured even with a cable.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A resin composition comprising:
    a mixture of a base resin and a magnesium hydroxide flame retardant;
    an antioxidant; and
    a lubricant,
    wherein the resin composition comprises an amount of about 2 to 5 parts by weight of the antioxidant and an amount of about 0.5 to 2 parts by weight of the lubricant with respect to 100 parts by weight of the mixture,
    wherein the mixture comprises an amount of about 40 to 60% by weight of the base resin and an amount of about 60 to 40% by weight of the magnesium hydroxide flame retardant, based on the total weight of the mixture,
    wherein a surface of the magnesium hydroxide flame retardant is treated with silane or aliphatic or polymeric fatty acid,
    wherein the base resin comprises 100 parts by weight of a high crystalline polypropylene resin, an amount of about 5 to 10 parts by weight of a modified polypropylene and an amount of about 15 to 20 parts by weight of an elastomer,
    wherein the high crystalline polypropylene resin comprises an amount of about 60 to 90% by weight of a high crystalline homo polypropylene resin and an amount of about 10 to 40% by weight of a high crystalline block polypropylene resin, based on the total weight of the high crystalline polypropylene resin, and
    wherein the base resin further comprises maleic acid in an amount of about 0.1 to 3 parts by weight with respect to 100 parts by weight of the base resin; and an initiator.

2. The resin composition of claim 1, wherein the high crystalline polypropylene resin has a hardness (R Scale) of about 100 or greater, a melting index (MI) of about 5 to 50 g/10 min, and a degree of crystallization of about 50% or greater.

3. The resin composition of claim 1 consisting essentially of:
- an amount of 100 parts by weight of the mixture that comprises the base resin and the magnesium hydroxide flame retardant;
- an amount of about 2 to 5 parts by weight of the antioxidant; and
- an amount of about 0.5 to 2 parts by weight of the lubricant,
- wherein the mixture comprises an amount of about 40 to 60% by weight of the base resin and an amount of about 60 to 40% by weight of the magnesium hydroxide flame retardant, based on the total weight of the mixture in the resin composition.

4. A method for preparing a cable material for a vehicle comprising,
- extruding a resin composition,
- wherein the resin composition comprises:
- a mixture of a base resin and a magnesium hydroxide flame retardant;
- an antioxidant; and
- a lubricant,
- wherein the resin composition comprises an amount of about 2 to 5 parts by weight of the antioxidant and an amount of about 0.5 to 2 parts by weight of the lubricant with respect to 100 parts by weight of the mixture,
- wherein the mixture comprises an amount of about 40 to 60% by weight of the base resin and an amount of about 60 to 40% by weight of the magnesium hydroxide flame retardant based on the total weight of the mixture;
- wherein a surface of the magnesium hydroxide flame retardant is treated with silane or aliphatic or polymeric fatty acid,
- wherein the base resin comprises 100 parts by weight of a high crystalline polypropylene resin, an amount of about 5 to 10 parts by weight of a modified polypropylene, and an amount of about 15 to 20 parts by weight of an elastomer,
- wherein the high crystalline polypropylene resin comprises an amount of about 60 to 90% by weight of a high crystalline homo polypropylene resin and an amount of about 10 to 40% by weight of a high crystalline block polypropylene resin, based on the total weight of the high crystalline polypropylene resin, and
- wherein the base resin further comprises maleic acid in an amount of about 0.1 to 3 parts by weight with respect to 100 parts by weight of the base resin; and an initiator, and
- wherein the extrusion was carried out at a temperature of about 180 to 230° C.

5. A cable comprising:
- a cable cover comprising a resin composition of claim 1, and
- a conductor comprising copper alloy or copper clad steel (CCS).

6. The cable of claim 5, wherein the copper alloy or CCS has a strength of 700 MPa or greater.

7. The cable of claim 5, wherein the copper alloy is an alloy conductor containing an amount of about 0.10 to 0.45% of Sn based on the total weigh of the copper alloy, and
- wherein the copper alloy has a strength of about 700 to 900 MPa and conductivity of about 70 to 90% according to International Annealed Copper Standard (IACS).

8. The cable of claim 5, wherein the CCS is a copper covered conductor having a copper area of about 30 to 40%, a conductivity of about 35 to 45% IACS, and, as for elongation, a strength property of about 700 to 900 MPa when softened by about 1 to 10%.

9. A vehicle comprising a cable of claim 5.

* * * * *